J. G. WILKISON.
Traction-Wheel.
No 53,209.
Patented Mar. 13, 1866.
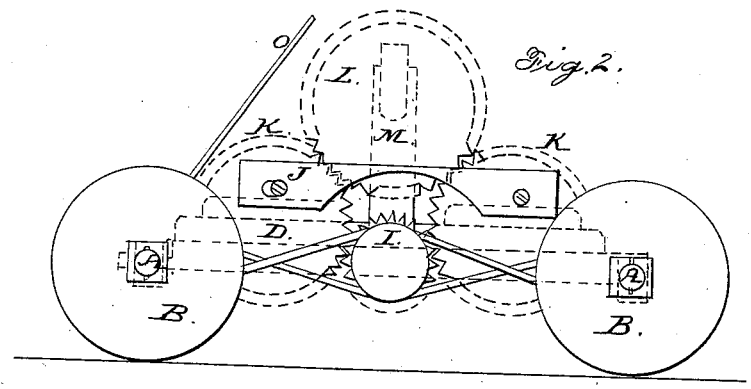
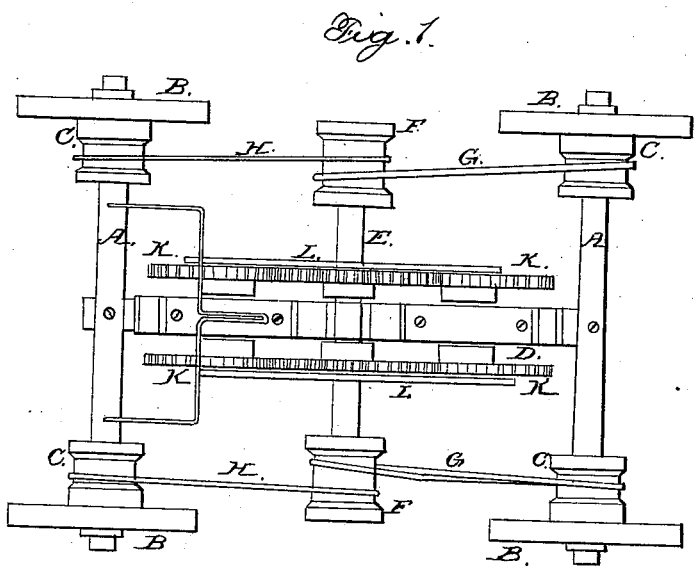
WITNESSES:
INVENTOR:
John G. Wilkison

UNITED STATES PATENT OFFICE.

JOHN G. WILKISON, OF QUINCY, OHIO.

IMPROVEMENT IN PROPELLING WHEELED VEHICLES.

Specification forming part of Letters Patent No. 53,209, dated March 13, 1866.

*To all whom it may concern:*

Be it known that I, JOHN G. WILKISON, of Quincy, in the county of Logan and State of Ohio, have invented certain new and useful Improvements in Propelling Wheeled Vehicles; and I do hereby declare that the following is a full, clear, and exact description of the same, reference being had to the accompanying drawings, and to the letters of reference marked thereon.

In the annexed drawings, making part of this specification, A represents the axles of this vehicle, which may be constructed in the ordinary manner. Upon each axle is secured, near its end, a pulley, C, as shown in the drawings.

B represents the four wheels of this vehicle, which are secured upon the axle outside of the pulleys, and to said pulleys.

D represents a bar which connects the two axles, and upon which certain machinery is secured, which will be hereinafter described.

E represents a shaft which lies crosswise of the vehicle, having its bearings upon the bar D. This shaft is centrally located between the hind and fore wheels of the vehicle, and has formed upon each end of it a pulley, F.

G represents a cord or band which passes from the pulley on the rear axle to the pulley on the shaft E, and H represents an elastic band or cord which passes from the front axle around the pulley F on the shaft E. The bar D is pivoted to the front axle, so that said front axle may turn in order to allow direction to be given to the vehicle.

Upon each side of the bar D are located two gear-wheels, K K. These wheels are secured upon axles which have their bearings upon the bar D. There are four of these wheels, and they mesh upon each side into two gear-wheels, I I, which said gear-wheels are secured upon the shaft E.

J represents a bar which is secured to the wheels K K, and by means of which they may be operated, said bars being pivoted to the said wheels to allow of their being operated by them.

A standard, M, is erected at the center of the bar D and immediately over the shaft E. In this standard a shaft has its bearings, and this shaft has upon its ends two wheels, L L. These wheels L L mesh into the wheels K K. There are handles upon the wheels L L, which are used by the operator upon the vehicle for applying power to the said wheels, and through them to the wheels K K, the wheels I I, the shaft E, and thence to the wheels of the machine.

The wheels L may be removed and power applied to the machine by means of the bars J J.

A platform upon which the operator (or one to be conveyed in this machine) stands can be made upon either or both sides of the bar D. This platform is made as wide as the size of the vehicle will admit of, and the operator, standing upon it, either turns the wheels L L by means of their handles, or, placing one foot upon one of the bars J, or upon each of said bars, thus propels the machine. An operator upon each side can use one foot upon the platform and one upon the bars J J for operating said bars.

This machine, it will be understood, is intended to be run by means of an operator who stands upon it, and not by any animal, steam, or other power. The operator standing upon the machine either applies power through and by means of the wheels L L, or by means, in its absence, of the bars J J, which connect the wheels K K.

The band H is made elastic, so that it will operate upon the front axle when it is used for giving direction to the machine.

A handle, O, may be used for guiding (by giving direction to the front axle) the machine, or the front axle may be operated by means of the feet of the operator.

By means of this machine a man may, upon good roads, drive himself a great distance in a day, and thus do away with the necessity of animal labor for propelling light vehicles.

Having thus fully described my invention, what I claim is—

The shaft E, provided with the pulleys F F and the wheels K K, bands G H, and pulleys C, for propelling the vehicle, in the manner and for the purpose herein specified.

JOHN G. WILKISON.

Witnesses:
C. M. ALEXANDER,
J. M. MASON.